US012041880B2

(12) United States Patent
Breure

(10) Patent No.: US 12,041,880 B2
(45) Date of Patent: Jul. 23, 2024

(54) SELF-PROPELLED AGRICULTURAL MACHINE HAVING ADJUSTABLE AXLE DISTANCE FOR WORKING AND TRANSPORT POSITIONS

(71) Applicant: Ploeger Oxbo Europe B.V., Roosendaal (NL)

(72) Inventor: Hendrik Willem Breure, Roosendaal (NL)

(73) Assignee: PLOEGER OXBO EUROPE B.V., Roosendaal (NL)

( * ) Notice: Subject to any disclaimer, the term of this patent is extended or adjusted under 35 U.S.C. 154(b) by 720 days.

(21) Appl. No.: 17/268,837

(22) PCT Filed: Aug. 20, 2019

(86) PCT No.: PCT/NL2019/050540
§ 371 (c)(1),
(2) Date: Feb. 16, 2021

(87) PCT Pub. No.: WO2020/046116
PCT Pub. Date: Mar. 5, 2020

(65) Prior Publication Data
US 2021/0185883 A1     Jun. 24, 2021

(30) Foreign Application Priority Data

Aug. 30, 2018    (NL) .................................... 2021518

(51) Int. Cl.
*A01D 67/00* (2006.01)
*B60B 35/10* (2006.01)
(Continued)

(52) U.S. Cl.
CPC .......... *A01D 67/00* (2013.01); *B60B 35/1063* (2013.01); *B62D 21/14* (2013.01); *B62D 49/0678* (2013.01); *B60G 2300/08* (2013.01)

(58) Field of Classification Search
CPC ......... A01D 67/00; A01D 41/00–41/16; A01B 73/00–73/067; A01B 69/00–028;
(Continued)

(56) References Cited

U.S. PATENT DOCUMENTS 3,051,257 A    8/1962   Selle
6,311,795 B1   11/2001  Skotnikov
(Continued)

FOREIGN PATENT DOCUMENTS

EP        2 661 169 B1    7/2016
WO   WO 2012/094331 A2   7/2012
(Continued)

*Primary Examiner* — Thomas B Will
*Assistant Examiner* — Madeline I Runco
(74) *Attorney, Agent, or Firm* — NIXON PEABODY LLP

(57) ABSTRACT

The invention relates to a self-propelled agricultural machine, for example a self-propelled merger, said self-propelled agricultural machine being provided with at least one motor, at least one elongated unit for carrying out, in use, an agricultural operation on the land, a first wheel axle and a second wheel axle located at a distance from the first wheel axle, wherein the first wheel axle and/or the second wheel axle is/are to be driven by the motor for moving the agricultural machine, wherein the elongated unit is movable from a transport position to a working position and vice versa, so that the maximum width of the self-propelled agricultural machine in the unit's transport position is less than in the unit's working position.

14 Claims, 4 Drawing Sheets

(51) Int. Cl.
*B62D 21/14* (2006.01)
*B62D 49/06* (2006.01)

(58) Field of Classification Search
CPC ....... A01B 63/00–63/32; A01B 51/00–51/045; B60G 2300/40; B60G 2300/08; B62D 49/0678; B62D 21/14; B60B 35/1063
See application file for complete search history.

(56) References Cited

U.S. PATENT DOCUMENTS

| | | | |
|---|---|---|---|
| 2004/0255563 A1* | 12/2004 | Schafer | A01D 41/12 |
| | | | 56/1 |
| 2013/0014481 A1* | 1/2013 | Dow | A01D 84/00 |
| | | | 56/13.5 |
| 2014/0262559 A1* | 9/2014 | DeChristopher | B60B 33/0071 |
| | | | 180/6.2 |
| 2016/0234992 A1 | 8/2016 | Clifford et al. | |
| 2017/0274704 A1* | 9/2017 | Fay | B60B 33/0071 |
| 2017/0347518 A1* | 12/2017 | Brooks | B60N 2/002 |
| 2021/0037691 A1* | 2/2021 | Horsch | A01B 51/026 |

FOREIGN PATENT DOCUMENTS

| | | |
|---|---|---|
| WO | WO 2012/094331 A3 | 10/2012 |
| WO | WO 2018/064724 A1 | 4/2018 |

\* cited by examiner

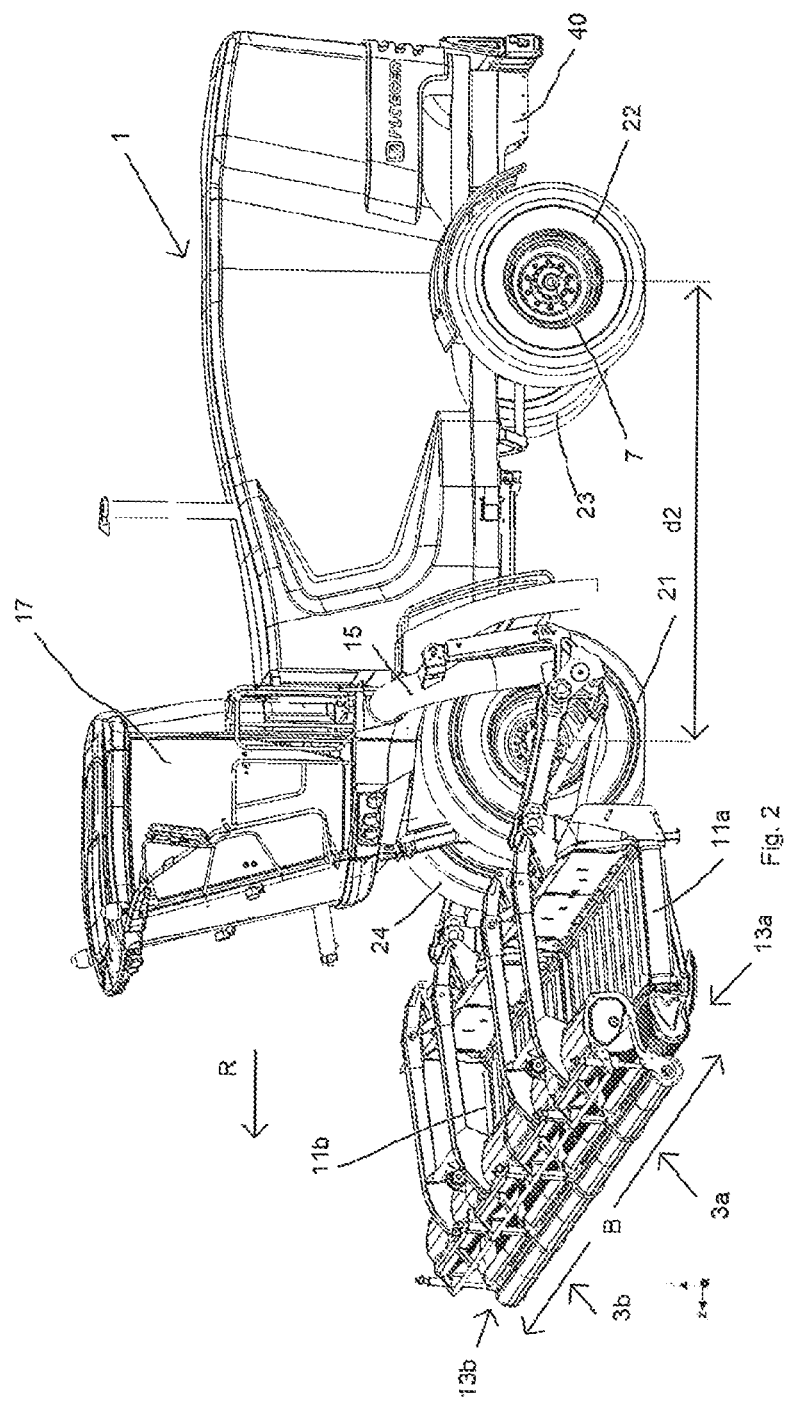

SELF-PROPELLED AGRICULTURAL MACHINE HAVING ADJUSTABLE AXLE DISTANCE FOR WORKING AND TRANSPORT POSITIONS

CROSS-REFERENCE TO RELATED APPLICATIONS

This application is a national stage of Application No. PCT/NL2019/050540 filed Aug. 20, 2019 that claims the benefit of priority from Netherlands Application No. 2021518 filed on Aug. 30, 2018, which are both incorporated by reference in their entireties.

The invention relates to a self-propelled agricultural machine, for example a self-propelled merger, said self-propelled agricultural machine being provided with at least one motor, at least one elongated unit for carrying out, in use, an agricultural operation on the land, a first wheel axle and a second wheel axle located at a distance from the first wheel axle, wherein the first wheel axle and/or the second wheel axle is/are to be driven by the motor for moving the agricultural machine, wherein the elongated unit is movable from a transport position to a working position and vice versa, so that the maximum width of the self-propelled agricultural machine in the unit's transport position is less than in the unit's working position.

A self-propelled merger (belt rake) of this kind is known for example from EP 2 661 169 A2. In the known self-propelled agricultural machine from this publication, in the working position of the machine, for example as shown in FIG. 1 of EP 2 661 169 A2, a relatively large amount of weight is on the front wheel axle. This may mean that wheels of the rear wheel axle do not have optimum contact with the ground.

It is therefore an aim of the invention to provide a self-propelled agricultural machine in which an improved weight distribution in the agricultural machine can be achieved between a working position and a transport position of the unit.

This aim of the invention is achieved with the self-propelled agricultural machine as claimed in claim 1.

In the self-propelled agricultural machine described above, the distance between the first wheel axle and the second wheel axle is to be varied depending on the position of the elongated unit. In this way the distance/wheel base between front wheel axle and rear wheel axle can be adjusted depending on whether the elongated unit is in the working position or in the transport position or somewhere between the working position and the transport position. By adjusting this distance it is possible to create an optimum weight distribution to ensure a stable vehicle and/or optimum contact of the wheels of the wheel axles with the ground, for example such as better traction of the wheels, in particular of a wheel axle driven by the motor.

By varying the distance, the most suitable wheel base can be selected for achieving the best weight distribution depending on whether the self-propelled agricultural machine is moving on the land for carrying out an agricultural operation with the unit or on the public highway. An additional advantage is that by making the distance smaller between the first wheel axle and the second wheel axle, a shorter turning circle can be achieved on the land so that the manoeuvrability of the self-propelled agricultural machine on the land while carrying out the agricultural operation with the unit can be improved. Another additional advantage is that by increasing the wheel base in the transport position of the at least one unit, the weight distribution can be optimized for transport on the public highway, where normally higher speeds are reached than in the field. The larger distance between the wheel axles ensures, in the transport position of the at least one unit, a more stable vehicle with better road handling/holding, especially at higher speeds.

Finally, no, or fewer, ballast weights are necessary in the claimed self-propelled agricultural machine. Ballast weights are often used in self-propelled agricultural machines so that if the elongated unit is in the working position, in which more weight is supported on the front axle than in the transport position, sufficient weight is maintained on the rear axle. No or fewer ballast weights means a lower weight of the self-propelled agricultural machine, which leads to positive effects, for example such as fuel saving for movement of the agricultural machine both during transport and when carrying out activities on the land.

In operation the distance between the wheel axles is reduced in order to obtain more weight on the second wheel axle, the rear axle, if the elongated unit is in the working position, because by moving the elongated unit to the working position the weight or the centre of gravity is moved forwards compared to the transport position, i.e. more weight will be supported on the first wheel axle, the front axle. The distance between the first wheel axle and the second wheel axle of the agricultural machine is as a result smaller in the working position than in the transport position. The smaller wheel base provides an improved weight distribution between the first and the second wheel axle, which provides a more stable agricultural machine in the working position and produces optimum contact of the wheels of the first and second wheel axles of the agricultural machine with the ground in the working position, so that the machine can be used reliably on the land for carrying out an agricultural operation in nearly all circumstances. The circumstances may for example comprise the type of ground, relatively flat ground or on a slope, but also for example the conditions of the ground such as dry or waterlogged ground.

The at least one elongated unit is located in the working position for the first wheel axle, the front wheel axle, wherein in the transport position the at least one elongated unit is located largely or completely behind the first wheel axle.

It is possible that the distance between the first wheel axle and the second wheel axle is adjustable automatically depending on the position of the elongated unit. In this way the most favourable weight distribution is selected automatically. Optionally, other parameters, for example such as weather conditions, type of ground, state of the ground may be used by an on-board computer of the self-propelled agricultural machine for automatically adjusting the weight distribution. The parameters can be obtained online and/or via sensors fitted to the agricultural machine. Although an automatic set-up is easier to use, it is naturally also possible for an operator to adjust the distance between the wheel axles by manual operation from the cabin of the agricultural machine.

In one aspect, at least one of the wheel axles is provided with a displacement mechanism for altering the distance between the first wheel axle and the second wheel axle.

In an embodiment that can be implemented with a particularly simple design, the displacement mechanism comprises a driving member, for example a cylinder, for moving the first wheel axle and/or the second wheel axle in the longitudinal direction of the agricultural machine. The displacement mechanism may further comprise a shaft, over which the first wheel axle and/or the second wheel axle is slidable.

A displacement mechanism with the cylinder and the shaft provides a reliable and cost-effective mechanism for displacing one wheel axle relative to the other wheel axle for altering the wheel base between them. Such a mechanism is also easily accessible for mechanics/operators for inspections, repairs and/or maintenance activities.

Finally the invention further relates to the use of a self-propelled agricultural machine described above. To avoid unnecessary repetitions, for the advantages of using the agricultural machine, reference is made to the advantages already described in this document in operation of the self-propelled agricultural machine.

The aspects described above will be explained hereunder based on an embodiment example in conjunction with the figures. However, the invention is not limited to the embodiment example described hereunder. Rather, a number of variants and modifications are possible, which also make use of the idea of the invention and consequently fall within the scope of protection. In particular it is pointed out that it is possible for the features/aspects that are mentioned individually in the description and/or are shown in the figures to be combined with the features of the claims in so far as compatible.

FIG. 2 shows a side view of a self-propelled merger in the operating mode for carrying out an agricultural operation on the land, more particularly forming a windrow on the land;

In the figures, the same components are given the same reference signs.

Figure 1:
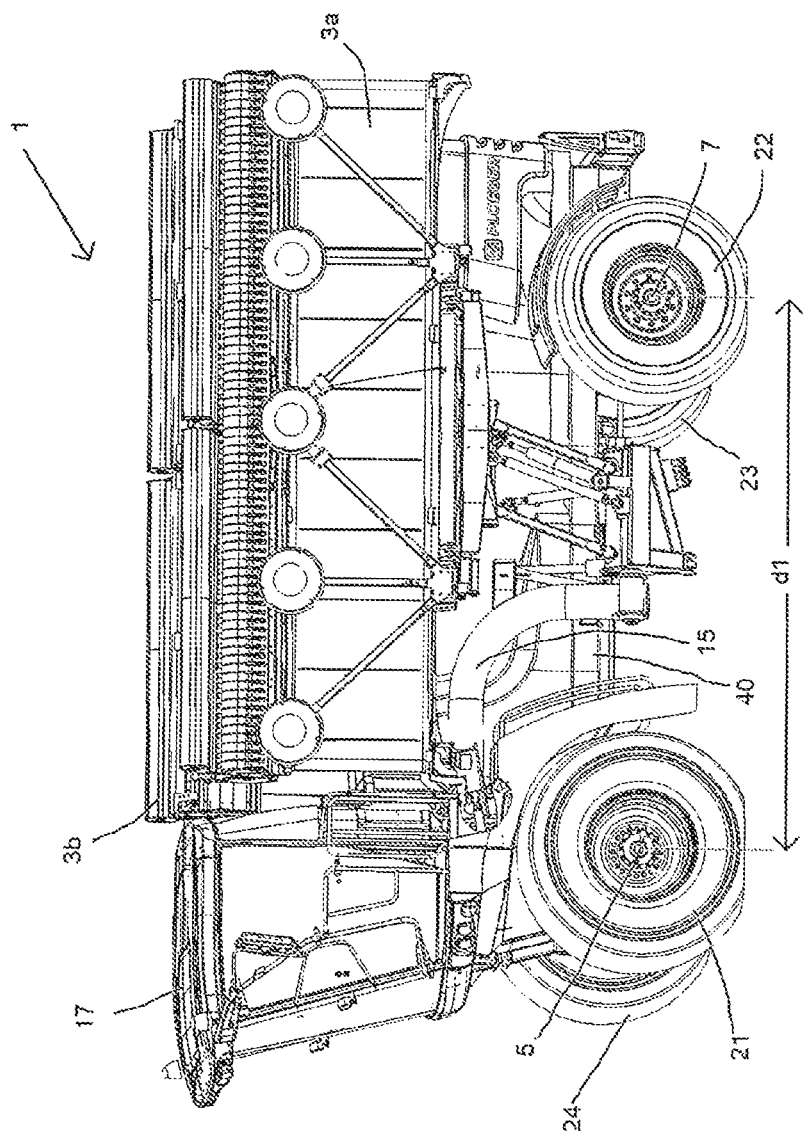
FIG. 1 shows a side view of a self-propelled merger in the transport operating mode.

FIGS. 1 and 2 show a self-propelled agricultural machine, more particularly a self-propelled merger 1 (belt rake). Although the invention described in the claims is especially suitable for application in a self-propelled merger 1, the invention described in the claims can also be applied in other self-propelled haymaking machines or self-propelled agricultural machines, especially agricultural machines in which a relatively large weight change occurs between the working operating mode on the land and the transport operating mode on (public) roads.

The merger 1 is provided with at least one motor (not shown), with two elongated units 3a, 3b, with a first wheel axle 5 and a second wheel axle 7 located at a distance d1, d2 from the first wheel axle 5. The first wheel axle 5 and the second wheel axle 7 are to be driven by the motor for moving the merger 1 over the land or over the public roads. As an alternative, only the first wheel axle 5 or the second wheel axle 7 is to be driven by the motor. The first wheel axle 5 and/or the second wheel axle 7 may be of steerable configuration for steering the agricultural machine in the field or over the road.

Although two elongated units 3a, 3b are shown in the figures it is also possible to design a merger with only one or more then two elongated units 3a, 3b. For example, the merger may comprise a third elongated unit (not shown) that is located between two elongated units in the working position. The third can be fitted at the front of the merger 1 and can be configured to be movable up and down for adopting a working position and/or a transport position. Both positions of the third unit are adopted at the front of the merger 1.

By means of the two elongated units 3a, 3b, in use an agricultural operation is to be carried out on the land. More particularly each elongated unit 3a, 3b shown is provided with a conveyor belt 11a, 11b as well as with a product lifting mechanism 13a, 13b for picking up a product from the land, for example for picking up hay or a similar product, and moving the product onto the conveyor belt 11a, 11b, whereby the product is to be put back onto the land on the left or right relative to the direction of travel R of the agricultural machine as indicated by arrow R in FIG. 2, for example to form a windrow. A windrow is a row of plants that is laid down on the land by harvesting machines such as the merger 1 shown, for subsequent operation. The subsequent operation may be for example chopping, baling or picking up with a self-loader. Space is made for the belts/wheels 21, 22, 23, 24 of the merger 1 or another harvesting machine for a subsequent harvesting operation or for carrying out a subsequent agricultural operation on the land.

In the working position of the merger 1 shown in FIG. 2, the conveyor belts 11a, 11b of the two elongated units 3a, 3b can be positioned relative to each other so that the conveyor belts 11a, 11b form a whole for depositing the product on the left or right relative to the direction of travel R of the merger 1.

In the merger 1, each elongated unit 3a, 3b is movable from a transport position as shown in FIG. 1 to a working position as shown in FIG. 2 and vice versa. In the transport position of the units 3a, 3b the maximum width of the merger 1 is smaller than the maximum width B (FIG. 2) in the working position of the units. The ratio of the transport position width to the working position width B is at least 1:1.5, preferably at least 1:2. The elongated unit may comprise a length measurement of 2.5-7.5 metres. The merger 1 has a folding mechanism 15 for moving the elongated units or folding them in or out between the working position and the transport position. The folding mechanism 15 has hydraulic operation. The longitudinal direction indicated by the direction indicated by arrow B of an elongated unit makes, in the working position (FIG. 2), an angle of 80-100 degrees with the direction of travel indicated by the direction indicated by arrow R (FIG. 2). In the transport position of the at least one elongated unit in (FIG. 1) the longitudinal direction of the unit 3a, b makes an angle of 0-15 degrees with the direction of travel R, preferably 0-5 degrees. In the merger 1 shown in the figures, the angle, seen from a top view (not shown), between the working position and the transport position of each unit 3a, b is about 90 degrees.

The two elongated units 3a, 3b are of almost identical design.

The merger 1 further comprises the cabin 17 which is positioned so that it is located between the working position and the transport position of the elongated units.

As can be seen by comparing FIGS. 1 and 2, the distance d1, d2, also called wheel base, between the wheel axles 5, 7 is to be adjusted for altered circumstances in the merger 1, for example a displacement of the centre of gravity. Such a displacement of the centre of gravity is caused in operation because one or both units 3a, 3b move or conversely are moved from the transport position to the working position. The merger 1 shown in the figures comprises the advantageous function that the distance d1, d2 between the first wheel axle and the second wheel axle can be varied depending on the position of the elongated unit 3a, 3b, so that owing to this change in distance an optimum weight rests on each wheel axle 5, 7 so that improved operation of the merger 1 is possible. Therefore the wheel base can be adjusted inter alia between working conditions of the merger 1 on the field and transport conditions of the merger 1 on the public road. In particular, in the working conditions of the merger 1, by reducing the wheel base from the distance d1 to the distance d2 a more stable merger 1 can be obtained because for the wheel base with distance d2 more weight is transferred from the first wheel axle 5 to the second wheel axle 7. The weight increase on the first wheel axle 5 is caused by swivelling the elongated unit 3a, 3b from the transport position (FIG. 1) to the working position (FIG. 2). In the working position, the unit 3a, 3b is located in front of the first wheel axle 5, wherein in the transport position the unit 3a, 3b is located largely or even completely behind the first wheel axle 5.

Figure 3A:
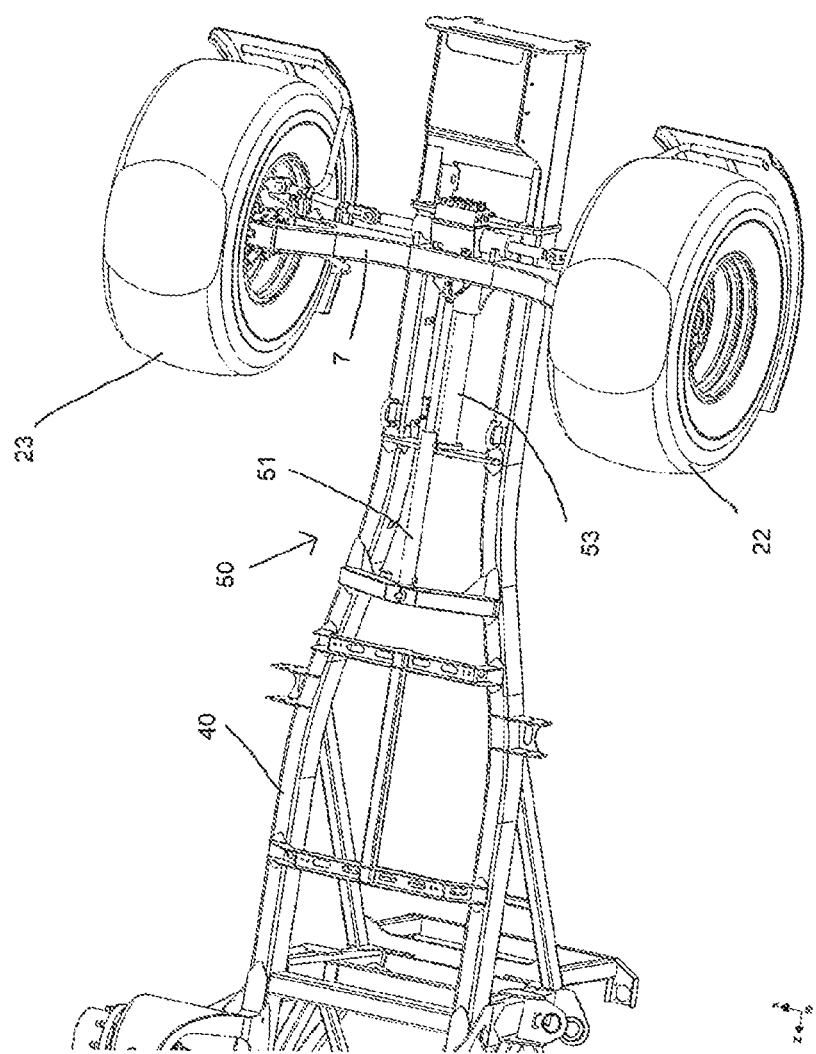
FIGS. 3a,3b show perspective detail views of the rear wheel axle of the self-propelled merger.
Figure 3B:
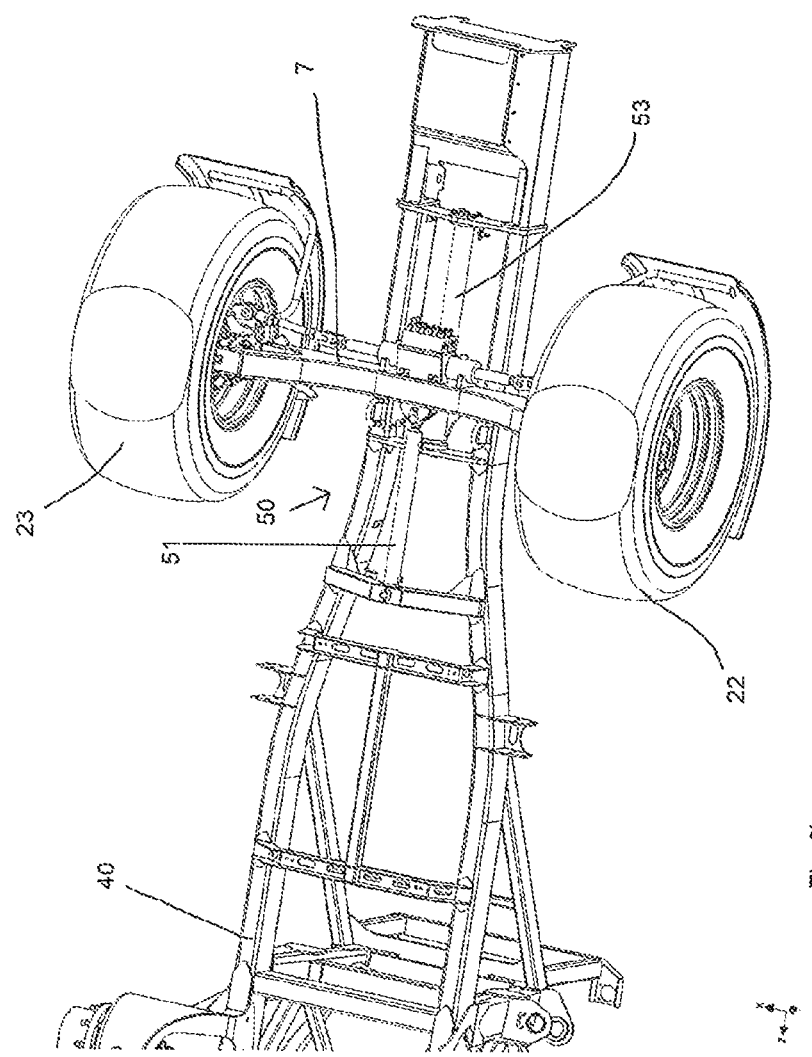

FIGS. 3a,3b show a simple and reliable displacement mechanism 50 for a wheel axle of the merger 1 shown in FIGS. 1 and 2. In these figures the second wheel axle 7 is provided with the displacement mechanism 50 for altering the distance between the first wheel axle 5 and the second wheel axle 7. Of course, in addition or as an alternative it is also possible to provide the first wheel axle 5 with such a displacement mechanism 50. The advantage of the displacement mechanism 50 on the second wheel axle 7 is that the second wheel axle 7 displacement is easier to carry out after the units are moved from the transport position to the working position, because after this displacement of the unit, the weight on the second wheel axle 7 is minimum, whereas the weight on the first wheel axle 5 is maximum. Similarly, in control engineering terms it is advantageous for this operation to increase the distance between the wheel axles 5, 7 by means of the displacement mechanism 50 before movement of the units from the working position to the transport position is carried out.

The displacement mechanism 50 comprises a driving member, in particular a cylinder 51, one end of which is connected to the chassis 40 and the movable end is connected to the second wheel axle 7 for moving the second wheel axle 7 in the longitudinal direction of the merger 1 for altering the wheel base d1, d2. The displacement mechanism further comprises a shaft 53, e.g. swing axle, fitted to the chassis 40, over which the first wheel axle and/or the second wheel axle is slidable in the longitudinal direction of the agricultural machine 1.

In FIG. 3a, the displacement mechanism is moved over a maximum distance so that the wheel base is maximum. This wheel base corresponds to the wheel base or distance d1 between the first wheel axle 5 and the second wheel axle 7, as shown in FIG. 1. In FIG. 3b, the displacement mechanism is retracted, so that the wheel base is minimum. This wheel base corresponds to the wheel base or distance d2 between the first wheel axle 5 and the second wheel axle 7, as shown in FIG. 2. Of course, it is also possible for the displacement mechanism 50 to occupy intermediate positions between the maximum and the minimum distance d1, d2, if this is preferred for example on account of certain circumstances. It is also possible to configure the displacement mechanism so that it is linked to the folding mechanism 15 of the at least one unit 3a, 3b, so that during operation of the folding mechanism 15 and/or after taking up the working position and/or the transport position, the displacement mechanism is operated automatically to provide a minimum wheel base d2 in the working position of the unit 3a, 3b and to provide a maximum wheel base d1 in the transport position of the unit 3a, 3b. In this way an optimum weight distribution over the wheel axles 5, 7 can be obtained for transport, and a different optimum weight distribution can be obtained over the wheel axles 5, 7 in use when carrying out an agricultural operation.

Optionally, other parameters for example such as weather conditions or type of ground can be used by an on-board computer (not shown) of the self-propelled agricultural machine for automatically setting or adjusting the weight distribution.

Although an automatic set-up is easier to use, it is naturally also possible for an operator (not shown) to adjust the distance between the wheel axles by manual operation from the cabin 17.

The invention claimed is:

1. A self-propelled agricultural machine, said self-propelled agricultural machine being provided with at least one motor, at least one elongated unit for carrying out, in use, an agricultural operation on the land, a first wheel axle and a second wheel axle located at a distance from the first wheel axle,
   wherein the first wheel axle and/or the second wheel axle is/are to be driven by the motor for moving the agricultural machine,
   wherein the elongated unit is movable from a transport position to a working position and vice versa, so that the maximum width of the self-propelled agricultural machine in the unit's transport position is less than in the unit's working position, characterized in that the distance between the first wheel axle and the second wheel axle is to be varied depending on the position of the elongated unit,
   wherein the at least one elongated unit is located in the working position in front of the first wheel axle, wherein in the transport position the at least one elongated unit is located largely or completely behind the first wheel axle.

2. The self-propelled agricultural machine according to claim 1, wherein the distance between the first wheel axle and the second wheel axle is smaller in the working position than in the transport position.

3. The self-propelled agricultural machine according to claim 1, wherein the first and/or the second wheel axle is/are provided with a displacement mechanism for altering the distance between the first wheel axle and the second wheel axle.

4. The self-propelled agricultural machine according to claim 3, wherein the displacement mechanism comprises a driving member, for moving the first wheel axle and/or the second wheel axle in the longitudinal direction of the agricultural machine.

5. The self-propelled agricultural machine according to claim 3, wherein the displacement mechanism comprises a shaft over which the first wheel axle and/or the second wheel axle is slidable.

6. The self-propelled agricultural machine according to claim 1, wherein the longitudinal direction of the at least one elongated unit in the working position makes an angle of 80-100 degrees with the direction of travel of the agricultural machine, wherein the at least one elongated unit in the transport position makes an angle of 0-15 degrees with the direction of travel of the agricultural machine.

7. The self-propelled agricultural machine according to claim 1, comprising a cabin that is positioned on the agricultural machine in such a way that it is located between the working position and the transport position of the at least one elongated unit.

8. The self-propelled agricultural machine according to claim 1, wherein the at least one elongated unit includes at least two elongated units that are movable between the working position and the transport position.

9. The self-propelled agricultural machine according to claim 8, wherein in the working position, each of the at least two elongated units has a respective conveyor belt, the conveyor belts are positionable relative to each other so that the conveyor belts form a whole for depositing the product on the left or right relative to the direction of travel of the agricultural machine.

10. The self-propelled agricultural machine according to claim 8, comprising a third elongated unit which in the working position is located between the two elongated units.

11. The self-propelled agricultural machine according to claim 1, wherein the distance between the first wheel axle and the second wheel axle is adjustable automatically depending on the position of the elongated unit.

12. Use of a self-propelled agricultural machine according to claim 1.

13. A self-propelled agricultural machine, said self-propelled agricultural machine being provided with at least one motor, at least one elongated unit for carrying out, in use, an agricultural operation on the land, a first wheel axle and a second wheel axle located at a distance from the first wheel axle,
   wherein the first wheel axle and/or the second wheel axle is/are to be driven by the motor for moving the agricultural machine,
   wherein the elongated unit is movable from a transport position to a working position and vice versa, so that the maximum width of the self-propelled agricultural machine in the unit's transport position is less than in the unit's working position, characterized in that the distance between the first wheel axle and the second wheel axle is to be varied depending on the position of the elongated unit,
   wherein the at least one elongated unit is located in the working position in front of the first wheel axle, wherein in the transport position the at least one elongated unit is located largely or completely behind the first wheel axle,
   wherein the self-propelled agricultural machine further includes a folding mechanism for moving the at least one elongated unit between the working position and the transport position.

14. A self-propelled agricultural machine, said self-propelled agricultural machine being provided with at least one motor, at least one elongated unit for carrying out, in use, an agricultural operation on the land, a first wheel axle and a second wheel axle located at a distance from the first wheel axle,
   wherein the first wheel axle and/or the second wheel axle is/are to be driven by the motor for moving the agricultural machine,
   wherein the elongated unit is movable from a transport position to a working position and vice versa, so that the maximum width of the self-propelled agricultural machine in the unit's transport position is less than in the unit's working position, characterized in that the distance between the first wheel axle and the second wheel axle is to be varied depending on the position of the elongated unit,
   wherein the at least one elongated unit is located in the working position in front of the first wheel axle, wherein in the transport position the at least one elongated unit is located largely or completely behind the first wheel axle,
   wherein the at least one elongated unit is provided with a conveyor belt as well as with a product lifting mechanism for picking up a product from the land, and moving the product onto the conveyor belt, whereby the product is to be put back onto the land on the left or right relative to the direction of travel of the agricultural machine, for example to form a windrow.

* * * * *